United States Patent
Yamamoto

(10) Patent No.: US 10,427,541 B2
(45) Date of Patent: Oct. 1, 2019

(54) SADDLE-RIDE TYPE VEHICLE

(71) Applicant: HONDA MOTOR CO., LTD., Minato-ku, Tokyo (JP)

(72) Inventor: Kanta Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/714,066

(22) Filed: Sep. 25, 2017

(65) Prior Publication Data

US 2018/0086225 A1 Mar. 29, 2018

(30) Foreign Application Priority Data

Sep. 29, 2016 (JP) .................................. 2016-191771

(51) Int. Cl.
| | | |
|---|---|---|
| B60L 11/18 | (2006.01) | |
| B60R 16/04 | (2006.01) | |
| B62M 7/00 | (2010.01) | |
| B62K 11/04 | (2006.01) | |
| B60L 58/40 | (2019.01) | |
| B60L 50/71 | (2019.01) | |
| B62J 35/00 | (2006.01) | |

(52) U.S. Cl.
CPC ........... B60L 11/1896 (2013.01); B60L 50/71 (2019.02); B60L 58/40 (2019.02); B60R 16/04 (2013.01); B62K 11/04 (2013.01); B62M 7/00 (2013.01); B62J 35/00 (2013.01)

(58) Field of Classification Search
CPC ......... B60L 11/1896; B62M 7/00; B62J 35/00
See application file for complete search history.

(56) References Cited

U.S. PATENT DOCUMENTS

| | | | |
|---|---|---|---|
| 6,326,765 | B1 | 12/2001 | Hughes et al. |
| 6,679,345 | B2 | 1/2004 | Hirayama et al. |
| 7,255,191 | B2 | 8/2007 | Baldwin et al. |
| 8,056,658 | B2 | 11/2011 | Horii et al. |
| 2006/0065461 | A1 | 3/2006 | Makuta et al. |
| 2008/0236924 | A1* | 10/2008 | Horii ........................ B60K 1/04 180/220 |
| 2009/0020348 | A1* | 1/2009 | Horii ...................... B62K 3/005 180/65.31 |

(Continued)

FOREIGN PATENT DOCUMENTS

| | | |
|---|---|---|
| CN | 1328943 A | 1/2002 |
| CN | 1469821 A | 1/2004 |

(Continued)

OTHER PUBLICATIONS

Official communication issued in the corresponding Japanese Patent Application 2016-191771 dated Aug. 1, 2018.

(Continued)

*Primary Examiner* — Brian L Swenson
(74) *Attorney, Agent, or Firm* — Carrier Blackman & Associates, P.C.; William D. Blackman; Joseph P. Carrier

(57) ABSTRACT

A two-wheeled motor vehicle includes: a vehicle body frame; a rear wheel unit swingably supported on the vehicle body frame; a fuel cell unit supported on the vehicle body frame; a fuel tank extending rearwardly from the fuel cell unit over the rear wheel unit; and a secondary cell that is charged with electric power from the fuel cell unit and disposed below the fuel cell unit and the fuel tank.

15 Claims, 9 Drawing Sheets

(56) References Cited

U.S. PATENT DOCUMENTS

| 2009/0075152 A1* | 3/2009 | Horji | B62K 5/027 |
| | | | 429/444 |
| 2015/0232150 A1* | 8/2015 | Kosuge | B62M 7/02 |
| | | | 180/220 |
| 2016/0056482 A1* | 2/2016 | Otsuka | B60L 11/1898 |
| | | | 180/220 |

FOREIGN PATENT DOCUMENTS

| CN | 101274652 A | 10/2008 |
| CN | 101348158 A | 1/2009 |
| EP | 1 164 049 A1 | 12/2001 |
| EP | 1 772 362 A1 | 4/2007 |
| JP | 2001-315680 A | 11/2001 |
| JP | 2001-351652 A | 12/2001 |
| JP | 2002-068063 A | 3/2002 |
| JP | 2007-509813 A | 4/2007 |
| JP | 2008-221976 A | 9/2008 |
| JP | 2014-083926 A | 5/2014 |

OTHER PUBLICATIONS

Extended European search report issued over the corresponding EP patent application 17 192 440.0 dated Feb. 2, 2018.
Office Action issued in the corresponding Chinese Patent Application 201710879967.5 dated Apr. 3, 2019.

\* cited by examiner

SADDLE-RIDE TYPE VEHICLE

BACKGROUND OF THE INVENTION

Field of the Invention

The present invention relates to a saddle-ride type vehicle that is provided with a fuel cell.

Description of the Related Art

Saddle-ride type vehicles with fuel cells are generally known in the art. For example, as disclosed in Japanese Patent Application Laid-open No. 2014-83926, a saddle-ride type vehicle has a fuel cell that generates electric power based on a chemical reaction between hydrogen and oxygen from the atmosphere. The fuel cell is disposed above a fuel tank that is placed in a space surrounded by a main frame and a down frame. Electrical components such as a secondary cell and an inverter are mounted in place below the down frame.

The fuel cell is heavier than the fuel tank. Therefore, the fuel cell that is disposed above the fuel tank causes the saddle-ride type vehicle to have a center of gravity in a high position, tending to impair the stability with which the saddle-ride type vehicle travels and the stability with which the saddle-ride type vehicle is maneuvered.

SUMMARY OF THE INVENTION

The present invention has been achieved in view of the above-mentioned circumstances, and it is an object thereof to provide a saddle-ride type vehicle which is able to travel with increased stability though it incorporates a fuel cell therein.

In order to achieve the object, according to a first aspect of the present invention, there is provided a saddle-ride type vehicle comprising: a vehicle body frame; a rear wheel unit swingably supported on the vehicle body frame; a fuel cell unit supported on the vehicle body frame; a fuel tank extending rearwardly from the fuel cell unit over the rear wheel unit; and a secondary cell that is charged with electric power from the fuel cell unit and disposed below the fuel cell unit and the fuel tank.

With the first aspect, the fuel tank, which stores hydrogen, and the fuel cell unit, which is supplied with hydrogen, are thus juxtaposed in the longitudinal directions of the saddle-ride type vehicle, and the secondary cell is disposed below the fuel cell unit. Therefore, the center of gravity of the saddle-ride type vehicle can be made lower than if the fuel tank, the fuel cell unit, and the secondary cell are superposed in an up-down direction. The center of gravity of the saddle-ride type vehicle is positioned as forwardly of the rear wheel unit as possible, allowing the saddle-ride type vehicle to travel with increased stability.

According to a second aspect of the present invention, in addition to the first aspect, there is provided the saddle-ride type vehicle, further comprising a protective member for the fuel cell unit, interposed between the fuel cell unit and the secondary cell.

With the second aspect, the secondary cell and hydrogen can be prevented from contacting each other, and the use of the protective member contributes to a reduction in the number of parts used.

According to a third aspect of the present invention, in addition to the first or second aspect, there is provided the saddle-ride type vehicle, further comprising an electric motor for driving a rear wheel; and a controller for controlling electric power supplied to the electric motor generating a drive force for the rear wheel, the controller being disposed below the fuel cell unit and the fuel tank and behind the secondary cell.

With the third aspect, the controller and hydrogen can be prevented from contacting each other. When the fuel cell unit and the secondary cell supply electric power to the electric motor, required wiring can be short as the controller is disposed below the fuel cell unit and behind the secondary cell.

According to a fourth aspect of the present invention, in addition to the third aspect, the controller and the secondary cell are fixed to an electrical component cover mounted on the vehicle body frame.

With the fourth aspect, since the controller and the secondary cell are assembled on the vehicle body cover and thereafter the vehicle body cover is installed together with the fuel cell unit on the vehicle body frame, they can be installed in position with ease and with increased accuracy.

According to a fifth aspect of the present invention, in addition to the fourth aspect, there is provided the saddle-ride type vehicle, further comprising a frame unit mounted on the vehicle body frame and supporting the electrical component cover; wherein the electrical component cover is defined along the frame unit and has positioning portions on an outer surface thereof, the positioning portions positioning the frame unit.

With the fifth aspect, inasmuch as the frame unit is disposed on the outer surface of the electrical component cover, the rigidity of the electrical component cover can be increased. Since the positioning portions are provided on the outer surface of the electrical component cover, the assemblability of the electrical component cover with respect to the frame unit and the vehicle body frame can be improved.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention will be described below, referring to the attached drawings.

Figure 1:
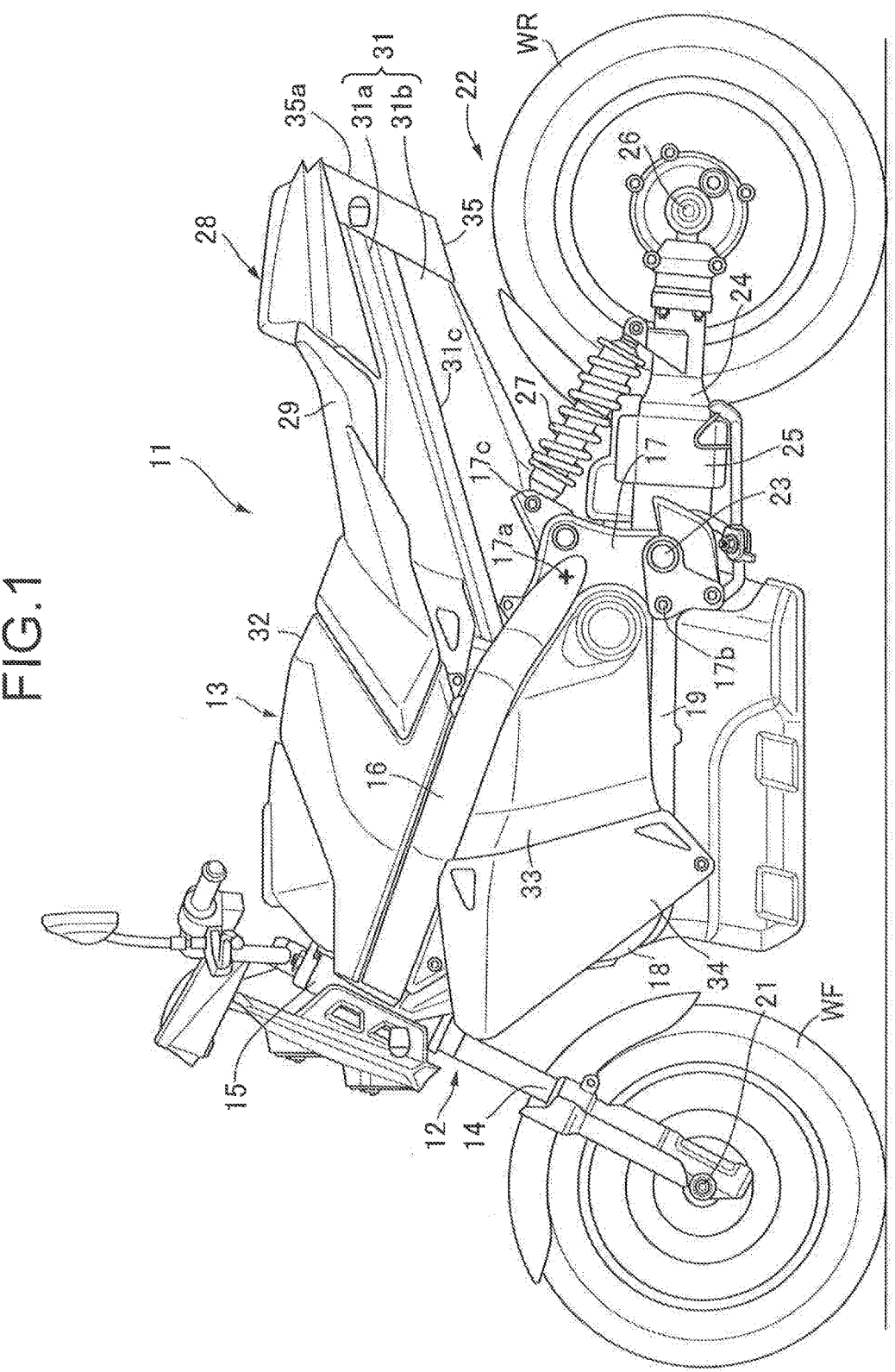
FIG. 1 is a side view schematically depicting the overall arrangement of a saddle-ride type vehicle, i.e., a two-wheeled motor vehicle, according to an embodiment of the present invention.

As depicted in FIG. 1, a saddle-ride type vehicle or two-wheeled motor vehicle 11 according to an embodiment of the present invention includes a vehicle body frame 12 and a vehicle body cover 13 mounted on the vehicle body frame 12. The vehicle body frame 12 includes a head pipe 15 on which a front fork 14 is steerably supported, a pair of left and right main frames 16 extending rearwardly and downwardly from the head pipe 15 at a first angle with respect to a horizontal plane, a pair of left and right pivot frames 17 joined to the respective rear ends of the main frames 16 at a first junction 17a and extending downwardly from the rear ends of the main frames 16, a pair of left and right down frames 18 extending downwardly from the head pipe 15 at a second angle, which is larger than the first angle, with respect to the horizontal plane, and a pair of left and right lower frames 19 extending from the respective rear ends of the down frames 18 and joined to the respective pivot frames 17 at a second junction 17b that is lower than the first junction 17a. A front wheel WF is rotatably supported on the front fork 14 around an axle 21. The vehicle body frame 12 is formed from a forming material of metal material.

The two-wheeled motor vehicle 11 includes a rear wheel unit 22. The rear wheel unit 22 has a swing frame 24 coupled to the pivot frames 17 via a horizontally extending pivot 23, and an electric motor 25 combined with the swing frame 24 and generating a drive force based on electric power supplied thereto. A rear wheel WR is rotatably supported on a free end of the swing frame 24 around an axle 26 parallel to the pivot 23. The rear wheel WR is thus coupled to the vehicle body frame 12. The lower frames 19 are disposed forwardly of the rear wheel WR. The electric motor 25 has a drive shaft connected to the rear wheel WR so as to transmit the drive force to the rear wheel WR.

A rear cushion 27 is installed between the vehicle body frame 12 and the swing frame 24. The rear cushion 27 has one end coupled to the pivot frames 17 at a third junction 17c that is provided above the pivot 23. The rear cushion 27 limits swinging movement of the vehicle body frame 12 with respect to the rear wheel unit 22, thereby minimizing vibrations transmitted from the rear wheel WR to the vehicle body frame 12.

The two-wheeled motor vehicle 11 includes a fuel supply assembly 28. The fuel supply assembly 28 has a seat frame 31 extending rearwardly from the main frames 16 above the rear wheel WR and supporting a rider's seat 29 thereon. As described later, the seat frame 31 is of a monocoque structure shaped as an exhaust duct for guiding an exhaust gas from a fuel cell unit 36 (see FIG. 2) as far as behind the rider's seat 29. The fuel supply assembly 28 is coupled to the main frames 16 above the pivot frames 17.

The seat frame 31 includes an upper body 31a and a lower body 31b that are joined to each other along a joint plane 31c which extends from the main frames 16 to the rear end of the seat frame 31. The rider's seat 29 is mounted on the upper body 31a. An occupant of the two-wheeled motor vehicle 11 sits astride the rider's seat 29.

The vehicle body cover 13 includes an upper cover 32 disposed above the left and right main frames 16 and coupled to them so as to straddle them from above, a pair of left and right side covers 33 disposed beneath the left and right main frames 16 and coupled respectively thereto, an air guide plate 34 joined to the side covers 33 and extending forwardly from its rear end, and a rear cover 35 covering the seat frame 31 behind the rider's seat 29. The rear cover 35 defines an exhaust port 35a at the rear end of the seat frame 31.

Figure 2:
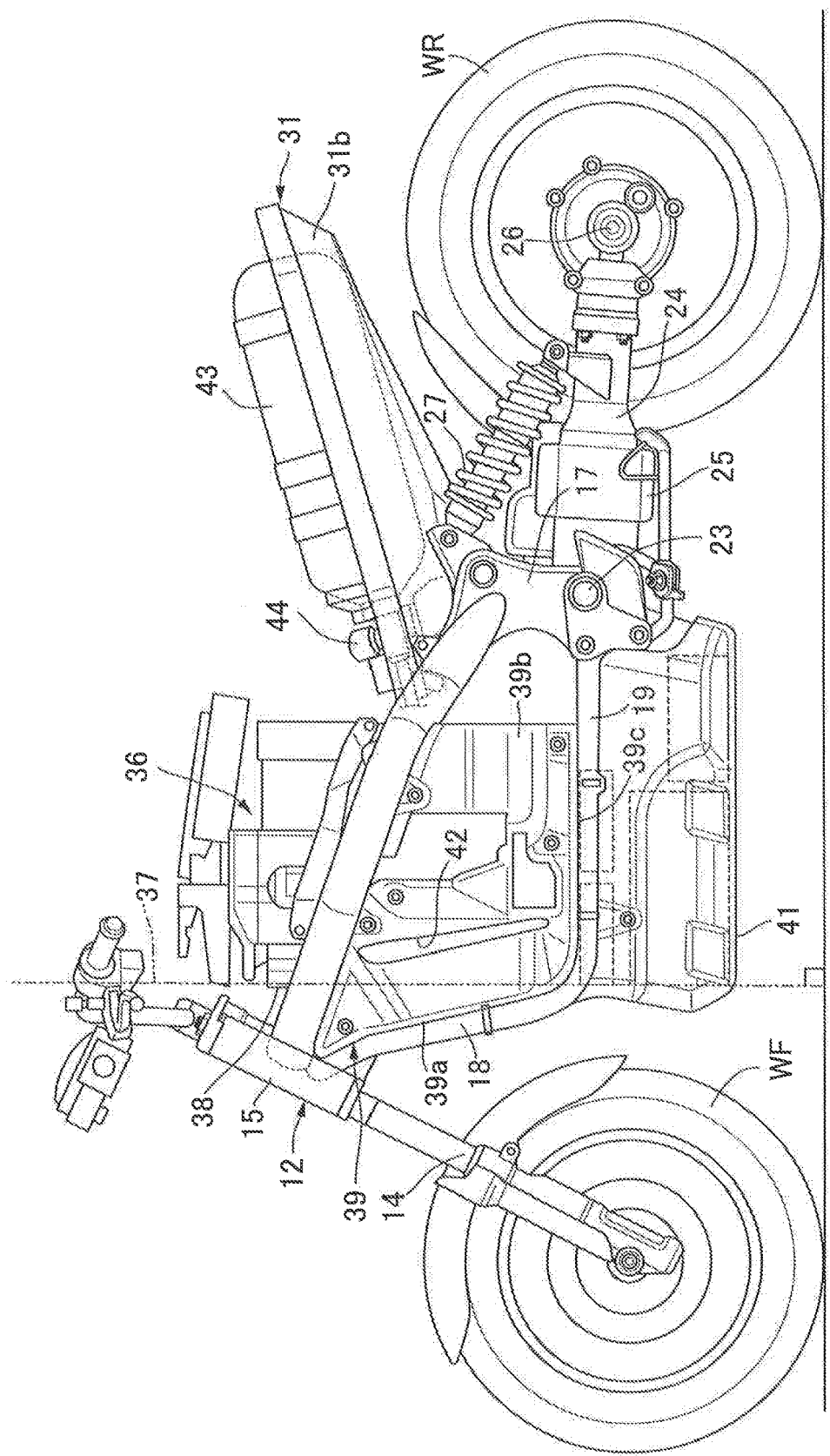
FIG. 2 is a side view schematically depicting a whole image of the two-wheeled motor vehicle, with a vehicle body cover removed.

As depicted in FIG. 2, the fuel cell unit 36 is mounted on the vehicle body frame 12. The fuel cell unit 36 is supported from below on the left and right lower frames 19 behind the head pipe 15. The down frames 18 extend downwardly in front of the fuel cell unit 36. The fuel cell unit 36 has an ambient air inlet port 38 along an imaginary plane 37 perpendicular to the ground and extending in a left-right direction of the two-wheeled motor vehicle 11. The fuel cell unit 36 generates electric power based on a chemical reaction between hydrogen and oxygen from the atmosphere. The fuel cell unit 36 uses the atmosphere flowing from the ambient air inlet port 38 thereinto for supplying oxygen and cooling itself.

The vehicle body cover 13 includes, in addition to the upper cover 32, the side covers 33, the air guide plate 34, and the rear cover 35, a fuel cell cover 39 covered with the side covers 33 and the air guide plate 34, and an electrical component cover 41 supported below the lower frames 19. The fuel cell cover 39 and the electrical component cover 41 are coupled to the vehicle body frame 12. The fuel cell cover 39 functions as a protective member for the fuel cell unit 36. Details of the electrical component cover 41 will be described below. The vehicle body cover 13 is formed from a molded body of resin material.

The fuel cell cover 39 has a front wall 39a, a pair of left and right side walls 39b, and a bottom plate 39c. The front wall 39a is provided between the left and right down frames 18. The side walls 39b are provided between the left and right main frames 16 and the corresponding down frames 18 and lower frames 19. The side walls 39b extend in a rearward direction of the two-wheeled motor vehicle 11 from respective left and right sides of the front wall 39a. The bottom plate 39c is provided along the horizontal plane between the left and right lower frames 19, and connected to the lower end of the front wall 39a and the lower ends of the side walls 39b. Front, side and lower surfaces of the fuel cell unit 36 below the main frames 16 are covered with the fuel cell cover 39. The side walls 39b have left and right air inlet ports 42 defined therein. Traveling wind is introduced from the air inlet ports 42 into the fuel cell cover 39. The bottom plate 39c supports the fuel cell unit 36 thereon from below.

A fuel tank 43 in the shape of a cylinder is mounted on the vehicle body frame 12. The fuel tank 43 is connected to a rear surface of the fuel cell unit 36, and extends rearwardly over the rear wheel unit 22. The fuel cell unit 36 and the fuel tank 43 are connected to each other by a fuel channel via a pressure regulating valve 44. The fuel tank 43 stores therein high-pressure hydrogen. The lower body 31b of the seat frame 31 supports the fuel tank 43 thereon from below. The fuel tank 43 is housed in the seat frame 31.

Figure 3:
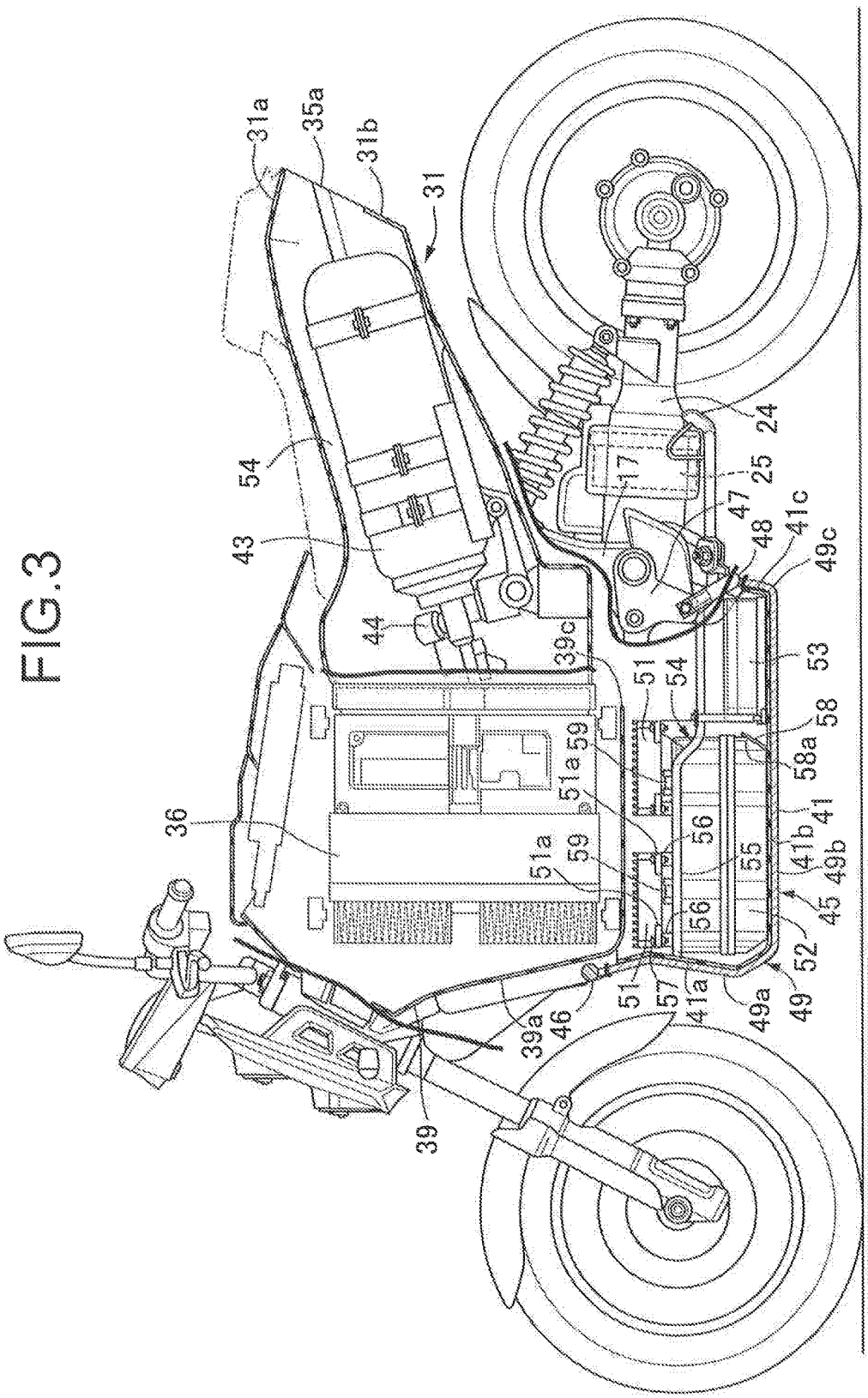
FIG. 3 is a partial see-through side view of the two-wheeled motor vehicle, schematically depicting the layout of electrical components on the two-wheeled motor vehicle.

As depicted in FIG. 3, the electrical component cover 41 is suspended and supported by the vehicle body frame 12 below the lower frames 19. In suspending and supporting the electrical component cover 41, a frame unit 45 is mounted on the electrical component cover 41. The frame unit 45 is disposed below the lower frames 19 and coupled to the vehicle body frame 12.

The frame unit 45 includes a first crossbar 46 extending horizontally in the left-right direction of the two-wheeled motor vehicle 11 and joined to the left and right down frames 18, a second crossbar 48 extending horizontally in the left-right direction of the two-wheeled motor vehicle 11 and joined to brackets 47 fixed to the pivot frames 17, and a pair of left and right support frames 49 extending from the first crossbar 46 to the second crossbar 48 parallel to each other in a longitudinal direction of the two-wheeled motor vehicle 11. Each of the support frames 49 is made up of a first frame body 49a extending downwardly from the first crossbar 46, a second frame body 49b extending continuously from the lower end of the first frame body 49a horizontally rearwardly, and a third frame body 49c extending upwardly from the rear end of the second frame body 49b and joined to the second crossbar 48. The first frame body 49a, the second frame body 49b, and the third frame body 49c are constructed as a continuous single member. The support frames 49 each have a shape following the outer surface of the electrical component cover 41.

The electrical component cover 41 houses therein two voltage control units 51 electrically connected to the fuel cell unit 36 via a harness (not depicted), a secondary cell 52 electrically connected to the voltage control units 51 via a harness (not depicted), an inverter (controller) 53 electrically connected to the voltage control units 51 and the secondary cell 52 via a harness (not depicted), and other electrical components. The direct-current (DC) voltage of the fuel cell unit 36 is dropped by the voltage control units 51 and set to a voltage value suitable for controlling the electric motor 25. The secondary cell 52 is charged with electric power from the fuel cell unit 36. When necessary, electric power from the charged secondary cell 52 is supplied to the electric motor 25 and electrical components mounted on the two-wheeled motor vehicle 11. The inverter 53 converts the DC voltage of the fuel cell unit 36 and the secondary cell 52 into an alternating-current (AC) voltage, which is supplied to the electric motor 25. The inverter 53 is supplied with not only electric power from the fuel cell unit 36 but also electric power from the secondary cell 52, when necessary.

The voltage control units 51 are disposed below the fuel cell unit 36. In order to realize such a layout of the voltage control units 51, an auxiliary frame unit 54 is disposed within the electrical component cover 41. The auxiliary frame unit 54 has a pair of longitudinal frames 55 extending parallel to each other in the longitudinal directions of the two-wheeled motor vehicle 11. The longitudinal frames 55 extend from the first frame bodies 49a to the second crossbar 48 of the frame unit 45. Rests 56 for supporting the voltage control units 51 thereon are fixed to the longitudinal frames 55 above the secondary cell 52. Mounting plates 51a that project outwardly from side surfaces of the voltage control units 51 are placed on the rests 56. The mounting plates 51a are fastened to the rests 56 by screws 57 with resilient members such as grommets or the like being interposed between the mounting plates 51a and the rests 56.

A holder plate 58 is suspended and supported by the longitudinal frames 55. The holder plate 58 bears the rear end of the secondary cell 52 from below. The holder plate 58 has a slanted surface 58a that is inclined rearwardly of the two-wheeled motor vehicle 11 in an upward direction. The rear end of the secondary cell 52 has an oblique surface that is held in face-to-face contact with the slanted surface 58a. A resilient body such as a rubber sheet is interposed between the rear end of the secondary cell 52 and the holder plate 58. The resilient body may be bonded to the holder plate 58.

The auxiliary frame unit 54 includes a plurality of joint plates 59 extending horizontally in the left-right direction of the two-wheeled motor vehicle 11 and interconnecting the longitudinal frames 55. The joint plates 59 hold the secondary cell 52 against the second frame bodies 49b of the frame unit 45. The electrical component cover 41 includes a bottom plate 41b sandwiched between the secondary cell 52 and the second frame bodies 49b. Here, resilient bodies such as rubber sheets are interposed between the joint plates 59 and the secondary cell 52. The resilient bodies may be bonded to lower surfaces of the joint plates 59. Since the secondary cell 52 is thus prevented from being displaced in the up-down direction, the secondary cell 52 can be also prevented from being displaced longitudinally between a front wall 41a of the electrical component cover 41 and the holder plate 58. The secondary cell 52 is disposed below the fuel cell unit 36 and the fuel tank 43 that is provided behind the fuel cell unit 36.

The inverter 53 is disposed behind the holder plate 58 and in front of a rear wall 41c of the electrical component cover 41. The inverter 53 has a rear end held in abutment against the rear wall 41c of the electrical component cover 41. The inverter 53 is disposed below the fuel cell unit 36 and the fuel tank 43 and behind the secondary cell 52. The electrical component cover 41 functions as a protective cover for these electrical components. The bottom plate 39c of the fuel cell cover 39 is interposed between the fuel cell unit 36 and the voltage control units 51, separating the voltage control units 51 and the secondary cell 52 from the space that accommodates the fuel cell unit 36 therein.

Figure 4:
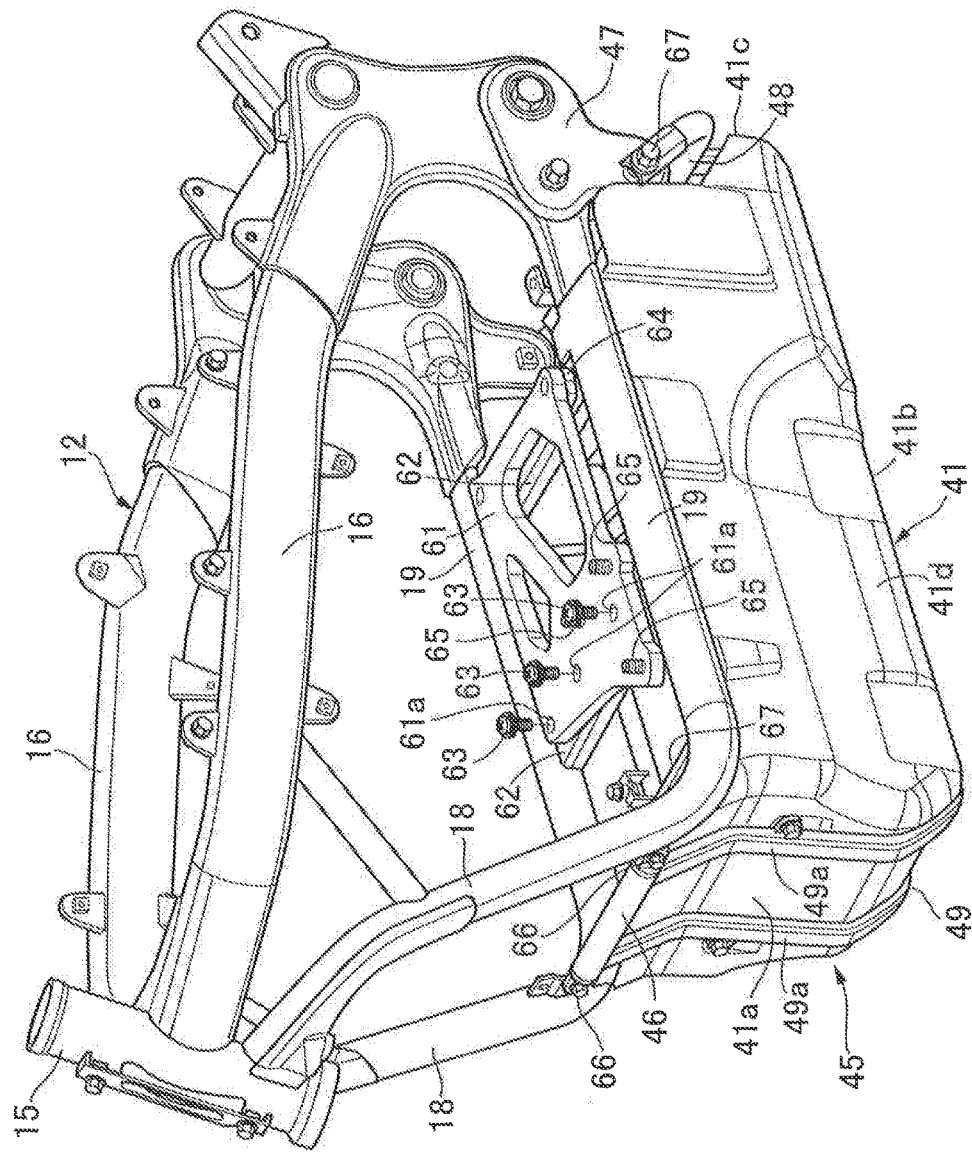
FIG. 4 is an enlarged perspective view schematically depicting a vehicle body frame and an electrical component cover.

As depicted in FIG. 4, the vehicle body frame 12 also includes a lower hanger plate 61 that is coupled to the left and right lower frames 19 below the fuel cell unit 36. In order to couple the lower hanger plate 61 to the left and right lower frames 19, a pair of front and rear crossbars 62 are fixed to the left and right lower frames 19. Each of the crossbars 62 extends horizontally in the left-right direction of the two-wheeled motor vehicle 11. The lower hanger plate 61 is fastened to the crossbars 62 by screws 63 that are passed through through holes 61a of the lower hanger plate 61 and threaded into the crossbars 62. Here, resilient members such as rubber bushings 64 are interposed between the crossbars 62 and the lower hanger plate 61. The fuel cell unit 36 has a lower end joined to the lower hanger plate 61. In order to join the lower end of the fuel cell unit 36 to the lower hanger plate 61, screws 65 are screwed into the lower hanger plate 61 from below. In this manner, the lower hanger plate 61 joins the fuel cell unit 36 to the lower frames 19.

The first crossbar 46 of the frame unit 45 has left and right ends fastened to the respective down frames 18 by screws 66. The screws 66 have their axes oriented in the longitudinal directions of the two-wheeled motor vehicle 11. The screws 66 are threaded horizontally from the front of the two-wheeled motor vehicle 11. The second crossbar 48 have left and right ends fastened to the respective brackets 47 by screws 67. The screws 67 have their axes oriented in the width directions of the two-wheeled motor vehicle 11. The screws 67 are each threaded horizontally from the side of the two-wheeled motor vehicle 11.

The electrical component cover 41 has a pair of left and right side plates 41d extending downwardly from the respective left and right lower frames 19. The bottom plate 41b of the electrical component cover 41 interconnects the lower ends of the side plates 41d and extends horizontally. The front wall 41a of the electrical component cover 41 is connected to the front end of the bottom plate 41b and the front ends of the side plates 41d, and closes the front end of a space between the side plates 41d from the front of the electrical component cover 41.

Figure 5:
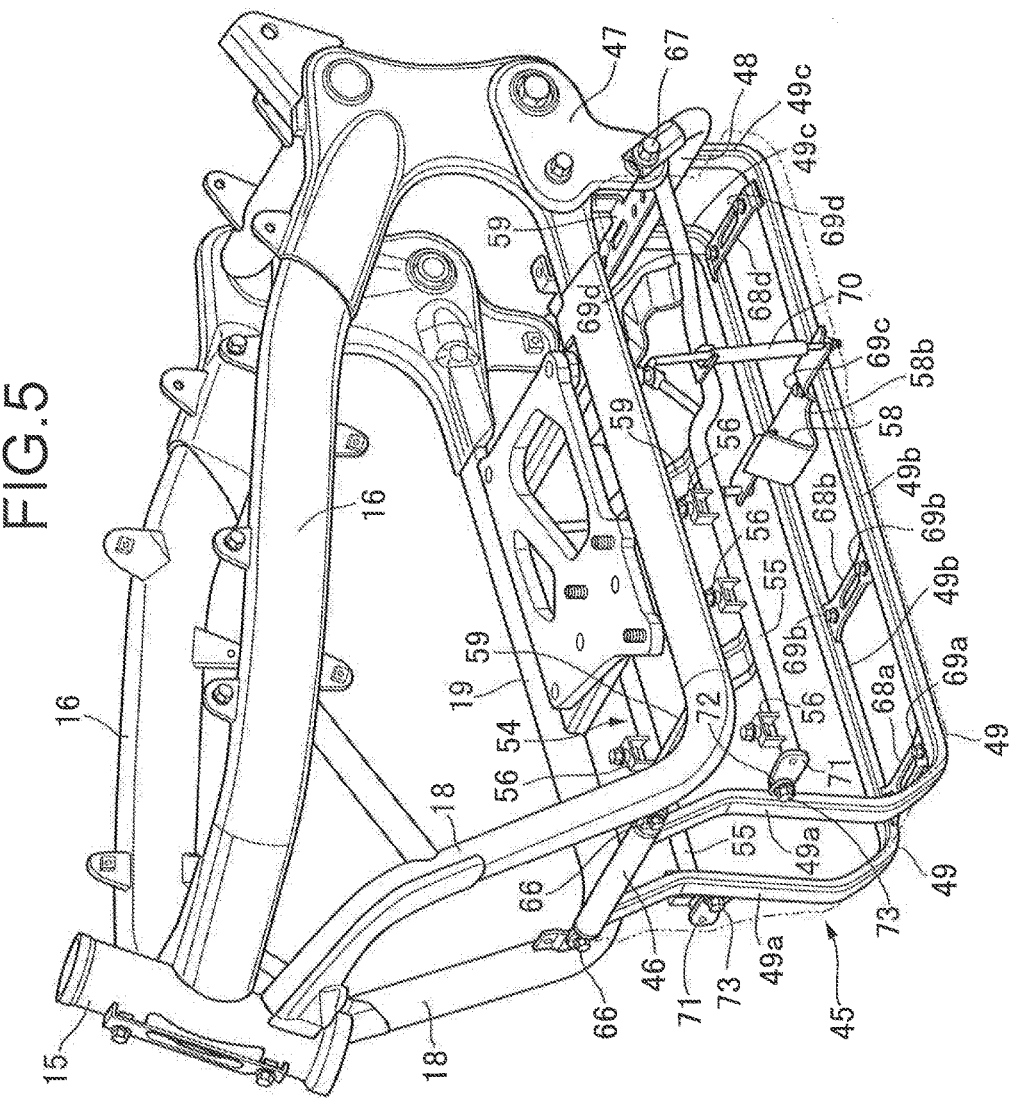
FIG. 5 is an enlarged perspective view schematically depicting the vehicle body frame and a frame unit.

As depicted in FIG. 5, plate pieces 68a, 68b, 68c (see FIG. 8), and 68d extend horizontally in the left-right direction of the two-wheeled motor vehicle 11 between the second frame bodies 49b and are joined thereto. The bottom plate 41b of the electrical component cover 41 is coupled to the plate pieces 68a, 68b, 68c, and 68d, which are superposed on the outer surface of the bottom plate 41b. Pairs of left and right nuts 69a and 69b are disposed on an inner side of the bottom plate 41b on the plate pieces 68a and 68b. A pair of left and right nuts 69c are disposed on a securing member 58b of the holder plate 58 on the inner side of the bottom plate 41b on the plate piece 68c. Rods 70 extending downwardly from the longitudinal frames 55 have tip ends inserted through positioning holes defined in an end of the inverter 53 and coupled to the securing member 58b of the holder plate 58. The inverter 53 has a bottom surface overlying the inner side of the bottom plate 41b on the plate piece 68d, and a pair of left and right nuts 69d are disposed on a bottom plate of the inverter 53.

The auxiliary frame unit 54 includes a pair of left and right lugs 71 joined to the respective front ends of the longitudinal frames 55. The lugs 71 are oriented perpendicularly to the longitudinal directions of the two-wheeled motor vehicle 11. Plate-shaped securing members 72 are joined to the respective first frame bodies 49a of the support frames 49. The securing members 72 are oriented perpendicularly to the longitudinal directions of the two-wheeled motor vehicle 11. The securing members 72 are placed on the respective lugs 71 of the longitudinal frames 55 with the electrical component cover 41 sandwiched therebetween. Screws 73 are horizontally threaded into the lugs 71 from the front and have their shanks extending through the electrical component cover 41 and the securing members 72. The auxiliary frame unit 54 is thus coupled to the frame unit 45 from outside of the electrical component cover 41.

Figure 6:
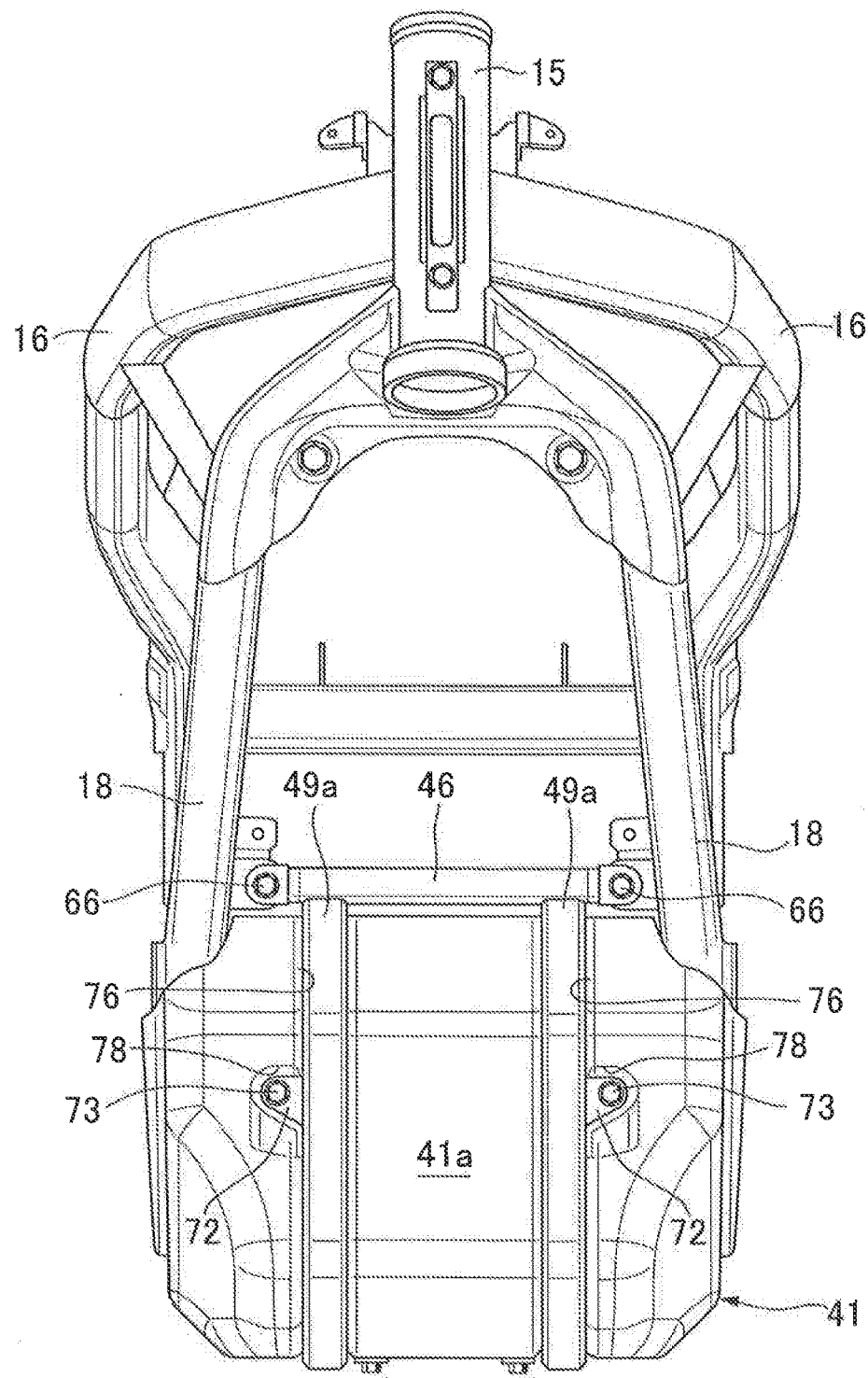
FIG. 6 is an enlarged front elevational view of the frame unit and the electrical component cover.
Figure 7:
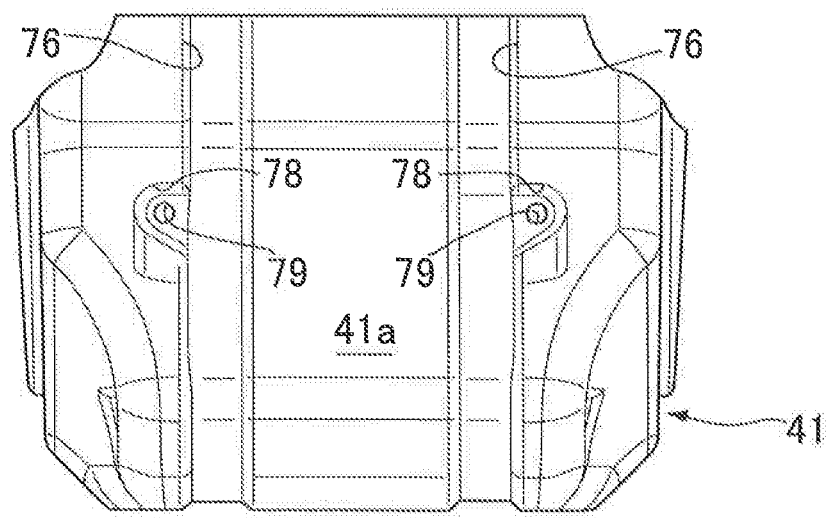
FIG. 7 is an enlarged front elevational view of the electrical component cover as a single unit.

As depicted in FIG. 6, the first frame bodies 49a of the support frames 49 are fitted to the front wall 41a of the electrical component cover 41. In order to fit the first frame bodies 49a to the front wall 41a, the front wall 41a has two first grooves 76 defined in an outer surface thereof, the first grooves 76 receiving the first frame bodies 49a therein. The first grooves 76 extend in the up-down direction from the upper end of the front wall 41a to the lower end thereof. The securing members 72 overlap the outer surface of the front wall 41a by being placed in recesses 78 connected to the first grooves 76. As depicted in FIG. 7, through holes 79 are defined in the front wall 41a at the respective recesses 78. The shanks of the screws 73 extend through the through holes 79 and are joined to the longitudinal frames 55 of the auxiliary frame unit 54.

Figure 8:
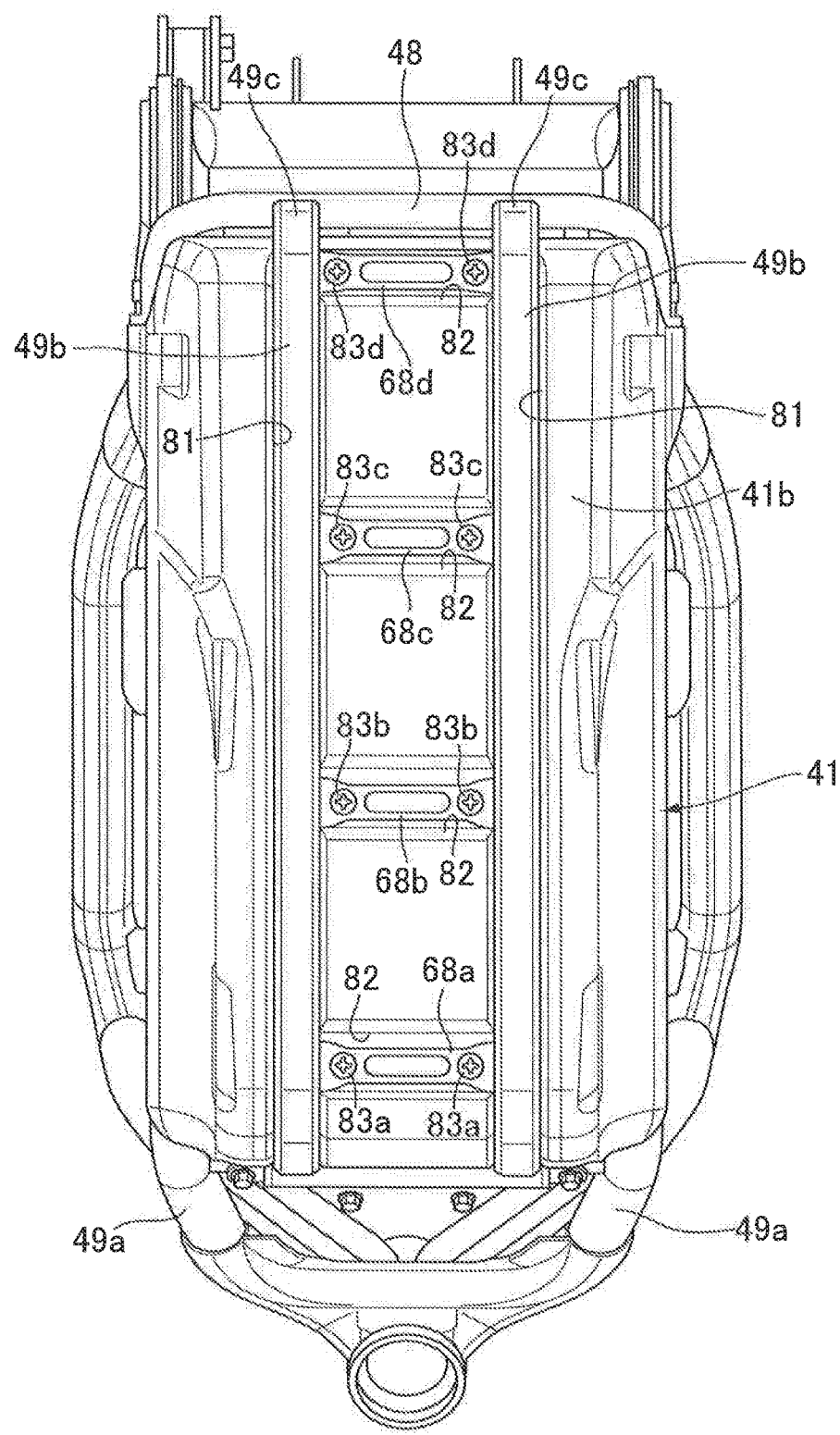
FIG. 8 is an enlarged bottom view of the frame unit and the electrical component cover.
Figure 9:
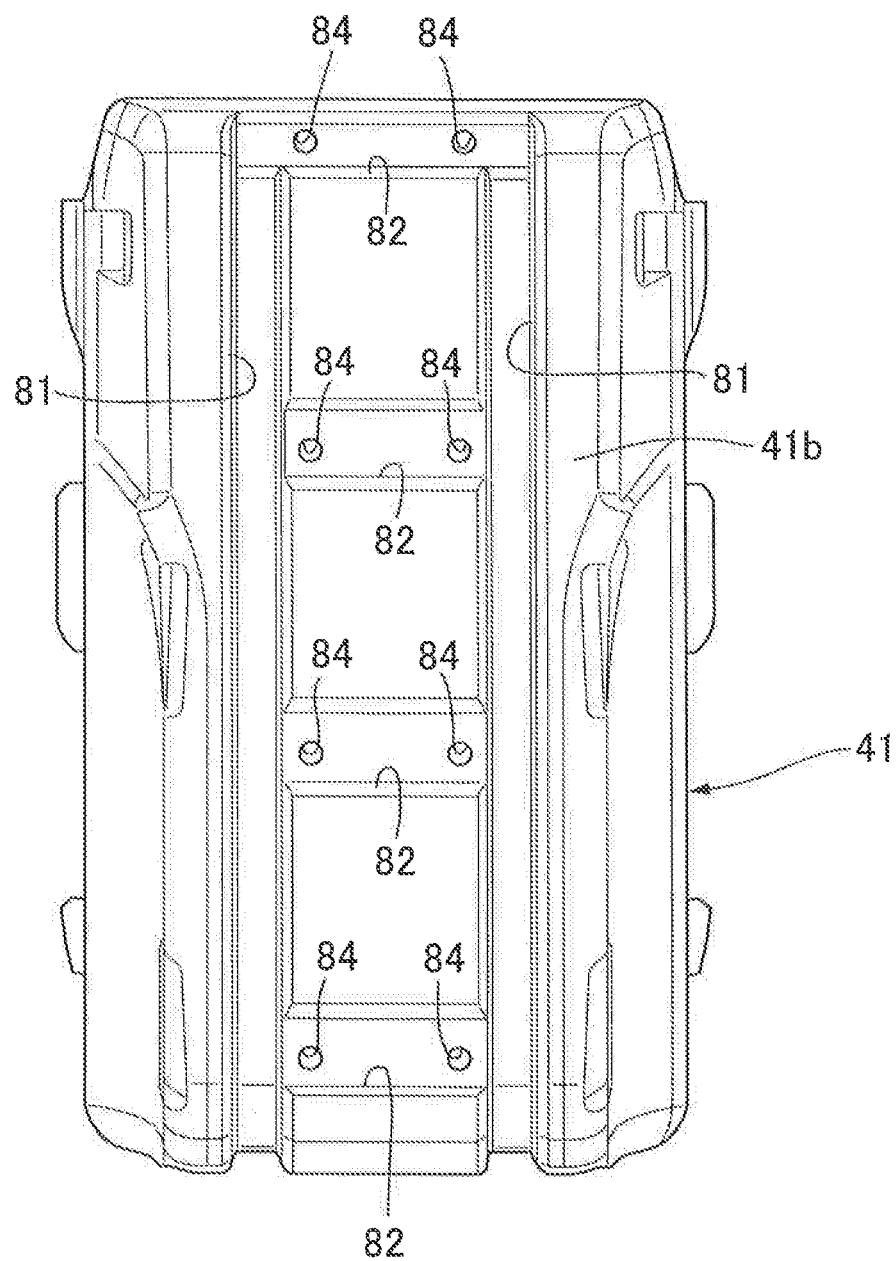
FIG. 9 is an enlarged bottom view of the electrical component cover as a single unit.

As depicted in FIG. 8, the second frame bodies 49b and the plate pieces 68a through 68d are fitted to the bottom plate 41b of the electrical component cover 41. In order to fit the second frame bodies 49b and the plate pieces 68a through 68d to the bottom plate 41b, the bottom plate 41b has second grooves 81 and third grooves 82 defined in an outer surface thereof for receiving the second frame bodies 49b and the plate pieces 68a through 68d, respectively, therein. The second grooves 81 extend in the longitudinal directions of the two-wheeled motor vehicle 11 and are connected to the lower ends of the first grooves 76. The third grooves 82 extend in the width direction of the two-wheeled motor vehicle 11 and interconnect the second grooves 81. The plate pieces 68a through 68d are superposed on the outer surface of the bottom plate 41b, on the bottom surfaces of the third grooves 82. Bolts 83a have shanks extending through the plate piece 68a and threaded into the nuts 69a on the bottom plate 41b of the electrical component cover 41. Bolts 83b have shanks extending through the plate piece 68b and threaded into the nuts 69b on the bottom plate 41b. Bolts 83c have shanks extending through the plate piece 68c and the securing member 58b of the holder plate 58 and threaded into the nuts 69c on the bottom plate 41b. The bolts 83c and the nuts 69c fasten together the plate piece 68c, the bottom plate 41b of the electrical component cover 41, and the holder plate 58. Bolts 83d have shanks extending through the plate piece 68d and the bottom plate of the inverter 53 and treaded into the nuts 69d. The bolts 83d and the nuts 69d fasten together the plate piece 68d, the bottom plate 41b of the electrical component cover 41, and the bottom plate of the inverter 53. As depicted in FIG. 9, the bottom plate 41b has through holes 84 defined therein at the third grooves 82. The shanks of the bolts 83a through 83d extend through the through holes 84 and are threaded into the nuts 69a through 69d on the inner side of the electrical component cover 41.

According to the present embodiment, the fuel cell unit 36 is supported on the lower frames 19. The fuel tank 43 extends rearwardly from the fuel cell unit 36 over the rear wheel unit 22. The fuel cell unit 36 is thus installed in a low position, making the center of gravity of the two-wheeled motor vehicle 11 low. According to the present embodiment, furthermore, the secondary cell 52 is disposed in front of the rear wheel unit 22 and below the fuel cell unit 36. The fuel tank 43, which stores hydrogen, and the fuel cell unit 36, which is supplied with hydrogen, are thus juxtaposed in the longitudinal direction of the two-wheeled motor vehicle 11, and the secondary cell 52 is disposed below the fuel cell unit 36. Therefore, the center of gravity of the two-wheeled motor vehicle 11 is made lower than if the fuel tank 43, the fuel cell unit 36, and the secondary cell 52 are superposed in the up-down direction. The center of gravity of the two-wheeled motor vehicle 11 is positioned as forwardly of the rear wheel unit 22 as possible, allowing the two-wheeled motor vehicle 11 to travel with increased stability. In addition, the secondary cell 52 and hydrogen are prevented from contacting each other.

The bottom plate 39c of the fuel cell cover 39 is interposed as a protective member between the fuel cell unit 36 and the secondary cell 52. The secondary cell 52 and hydrogen are thus more effectively prevented from contacting each other. Moreover, the use of the fuel cell cover 39 contributes to a reduction in the number of parts used.

The inverter 53 is disposed below the fuel cell unit 36 and the fuel tank 43 and behind the secondary cell 52. The inverter 53 and hydrogen are thus prevented from contacting each other. When the fuel cell unit 36 and the secondary cell 52 supply electric power to the electric motor 25, required wiring can be short as the inverter 53 is disposed below the fuel cell unit 36 and behind the secondary cell 52.

According to the present embodiment, the inverter 53 and the secondary cell 52 are fixed to the vehicle body cover 13 mounted on the vehicle body frame 12. Since the inverter 53 and the secondary cell 52 are assembled on the vehicle body cover 13 and thereafter the vehicle body cover 13 is installed together with the fuel cell unit 36 on the vehicle body frame 12, they can be installed in position with ease and with increased accuracy.

Inasmuch as the frame unit 45 is disposed on the outer surface of the electrical component cover 41, the rigidity of the electrical component cover 41 can be increased. Since positioning portions such as the first grooves 76, the second grooves 81, and the third grooves 82 are provided on the outer surface of the electrical component cover 41, the assemblability of the electrical component cover 41 with respect to the frame unit 45 and the vehicle body frame 12 is improved.

What is claimed is:
1. A saddle-ride type vehicle comprising:
a vehicle body frame;

a rear wheel unit swingably supported on the vehicle body frame via a pivot, the rear wheel unit comprising a rear wheel;

a fuel cell unit supported on the vehicle body frame;

a fuel tank extending rearwardly from the fuel cell unit over the rear wheel unit;

a secondary cell that is charged with electric power from the fuel cell unit;

an electric motor disposed in the rear wheel unit for driving the rear wheel; and a controller for controlling electric power supplied to the electric motor;

wherein the secondary cell and the controller are disposed below the fuel cell unit at a position forward of the rear wheel unit.

2. The saddle-ride type vehicle according to claim 1, further comprising a protective member for the fuel cell unit, the protective member interposed between the fuel cell unit and the secondary cell.

3. The saddle-ride type vehicle according to claim 2, wherein the controller is disposed behind the secondary cell.

4. The saddle-ride type vehicle according to claim 3, wherein the controller and the secondary cell are fixed to an electrical component cover mounted on the vehicle body frame.

5. The saddle-ride type vehicle according to claim 1, wherein the controller is disposed behind the secondary cell.

6. The saddle-ride type vehicle according to claim 5, wherein the controller and the secondary cell are fixed to an electrical component cover mounted on the vehicle body frame.

7. The saddle-ride type vehicle according to claim 6, further comprising:

a frame unit mounted on the vehicle body frame and supporting the electrical component cover;

wherein the electrical component cover is defined along the frame unit and has positioning portions on an outer surface thereof, the positioning portions positioning the frame unit.

8. The saddle-ride type vehicle according to claim 1, wherein the vehicle body frame comprises:

a head pipe;

a pair of left and right main frames extending rearwardly from the head pipe;

a pair of left and right down frames extending downwardly from the head pipe;

a pair of left and right lower frames extending rearwardly from respective rear ends of the left and right down frames; and a pair of left and right pivot frames joined to respective rear ends of the main frames and extending downwardly from the rear ends of the main frames;

wherein the fuel cell unit is positioned between the left and right main frames, and is supported on a plate which is mounted on the lower frames.

9. A saddle-ride vehicle comprising:

a vehicle body frame;

a rear wheel unit swingably supported on the vehicle body frame;

a fuel cell unit supported on the vehicle body frame;

a fuel tank extending rearwardly from the fuel cell unit over the rear wheel unit; and a secondary cell that is charged with electric power from the fuel cell unit and disposed below the fuel cell unit and the fuel tank;

wherein the vehicle body frame comprises:

a head pipe;

a pair of left and right main frames extending rearwardly from the head pipe;

a pair of left and right down frames extending downwardly from the head pipe;

a pair of left and right lower frames extending rearwardly from respective rear ends of the left and right down frames; and a pair of left and right pivot frames joined to respective rear ends of the main frames and extending downwardly from the rear ends of the main frames;

wherein the fuel cell unit is positioned between the left and right main frames, and is supported on a plate which is mounted on the lower frames.

10. The saddle-ride type according to claim 9, further comprising:

a protective member for the fuel cell unit, interposed between the fuel cell unit and the secondary cell.

11. The saddle-ride type vehicle according to claim 10, further comprising:

an electric motor for driving a rear wheel; and a controller for controlling electric power supplied to the electric motor generating a drive force for the rear wheel, the controller being disposed below the fuel cell unit and the fuel tank and behind the secondary cell.

12. The saddle-ride type vehicle according to claim 11, wherein the controller and the secondary cell are fixed to an electrical component cover mounted on the vehicle body frame.

13. The saddle-ride type vehicle according to claim 9, further comprising:

an electric motor for driving a rear wheel; and a controller for controlling electric power supplied to the electric motor generating a drive force for the rear wheel, the controller being disposed below the fuel cell unit and the fuel tank and behind the secondary cell.

14. The saddle-ride type vehicle according to claim 13, wherein the controller and the secondary cell are fixed to an electrical component cover mounted on the vehicle body frame.

15. The saddle-ride type vehicle according to claim 14, further comprising:

a frame unit mounted on the vehicle body frame and supporting the electrical component cover;

wherein the electrical component cover is defined along the frame unit and has positioning portions on an outer surface thereof, the positioning portions positioning the frame unit.

* * * * *